(No Model.) 2 Sheets—Sheet 1.

C. W. THOMPSON.
CUT-OFF VALVE MECHANISM.

No. 557,916. Patented Apr. 7, 1896.

Witnesses:
Edith J. Griswold
S. C. Connor

Inventor:
Courtenay W. Thompson
By his attorneys
Howson and Howson (No Model.) 2 Sheets—Sheet 2.

C. W. THOMPSON.
CUT-OFF VALVE MECHANISM.

No. 557,916. Patented Apr. 7, 1896.

Witnesses
Edith J. Griswold
S. C. Connor

Inventor:
Courtenay W. Thompson
By his attorneys
Howson and Howson

UNITED STATES PATENT OFFICE.

COURTENAY W. THOMPSON, OF LONDON, ENGLAND.

CUT-OFF-VALVE MECHANISM.

SPECIFICATION forming part of Letters Patent No. 557,916, dated April 7, 1896.

Application filed July 20, 1895. Serial No. 556,555. (No model.)

*To all whom it may concern:*

Be it known that I, COURTENAY WILLIAM THOMPSON, engineer, a subject of the Queen of Great Britain and Ireland, residing at 5 Fair Street, Tooley Street, London, in the county of Surrey, England, have invented certain Improvements in or Connected with Cut-Off-Valve Mechanism for Engines Worked by Steam or other Expansible Fluid, of which the following is a specification.

My invention relates to the cut-off-valve mechanism of engines worked by steam or other expansible fluid, the said cut-off valves being used with slide-valves which may be flat, piston, oscillating, or of other kind; and my said invention has for its object to produce simple and effective mechanism for the purpose of regulating the cut-off either by hand or by the governor.

According to my invention I combine with the cut-off valve a mechanism similar in its movements to those of any ordinary or suitable steam-engine reversing-gear, and I so adapt such gear and connect it to the cut-off valve that I vary the expansion to any extent desired by moving the said reversing-gear to either the forward or the reverse position or to any intermediate position; but I so adapt such gear that the cut-off-valve mechanism is not effective to reverse the engine, which requires to be done independently. I may adapt any ordinary and suitable reversing-gear, as aforesaid, to the cut-off valves. For instance, I may use the double eccentric reversing link-gear or Joy's gear or any of the numerous combinations of mechanism from which a resultant movement for the cut-off-valve rod is obtained, the expansion being varied by moving the said gear to the forward, reverse, or intermediate position.

I describe the cut-off mechanism herein set forth by reference to and by comparison with suitable reversing mechanisms, because it will be thereby readily understood (in all its modifications) by engineers; but I wish it to be understood that though the properties of the movements are similar in both cases, yet, on the contrary, the application and functions of the two mechanisms are conspicuously different—namely, the functions of such cut-off mechanism are not effective to reverse the engine, but are adapted to effect wide variations in the rate of expansion—and that when hereinbefore I have described the positions of the cut-off-valve mechanism as "forward" or "reverse" positions or other positions I thereby referred to equivalent positions in an ordinary reversing-gear. All steam-engine reversing-gears have a central or intermediate position, with the forward and reverse positions on either side, and this cut-off mechanism has similar properties; but hereinafter I will designate the equivalents thus: the forward position as the "late cut-off" position and the reverse position as the "early cut-off" position, with the intermediate positions.

Great variety in expansion is obtained by this cut-off-valve mechanism and cut-off valves, because in the late cut-off position of the cut-off mechanism the major part of the closing movement of the cut-off valves is obtained during the later portion of the stroke of the main piston, and in the early cut-off position of the cut-off mechanism the major part of the closing movement of the cut-off valves is obtained during the earlier portion of the stroke of the main piston, and proportionately for intermediate positions in the cut-off mechanism.

I may operate the cut-off slides on the back of main-valve slide-valves of any preferred construction or on the back of a fixed plate, the ports of which plate communicate suitably with openings for the motive fluid in the principal valve, with which latter the fixed plate may, if desired, be connected to balance the pressure of the motive fluid on them.

I will describe with reference to the accompanying drawings manners in which my invention may be carried into effect; but I do not limit myself to the precise examples shown.

The accompanying drawings illustrate arrangements according to my invention.

Fig. 1 illustrates a cut-off slide-valve such as is shown separately in Fig. 2, combined with a gear of such a nature as is shown separately in Fig. 6, and wherein the main valve may be operated in any convenient manner which is not shown.

Figure 1:
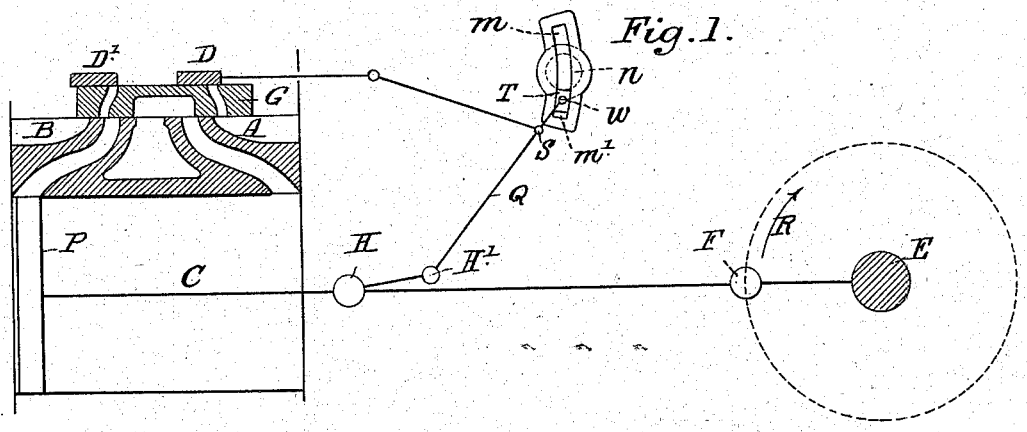
Figure 1 is a diagrammatic view illustrative of my invention.
Figure 2:
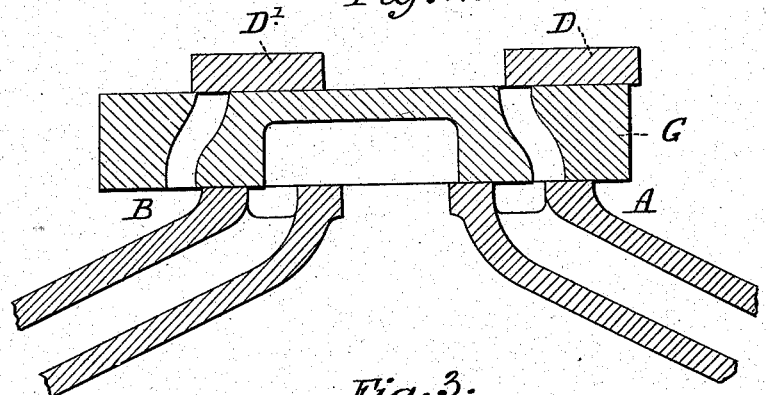
Figs. 2 and 3 are sectional views of forms of slide and cut-off valves which may be employed in carrying my invention into effect.

Fig. 2 shows separately a cut-off valve operating on the back of a main valve. A B is the face on which the main valve slides. C is the main valve. D and D' are the cut-off slides, which are operated by any ordinary or suitable reversing valve-gear, as hereinbefore explained.

Figure 3:
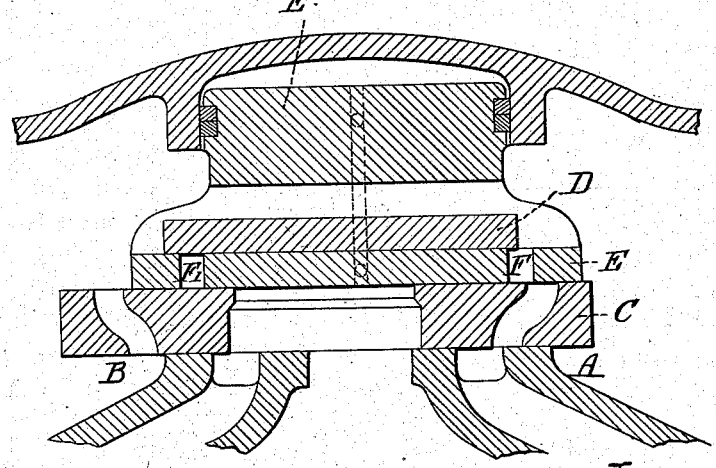

Fig. 3 illustrates a cut-off valve operating on the back of a fixed plate. A B is the face on which the main valve slides. C is the main valve. E is the fixed plate, shown as being connected to the pressure-relief piston E' for relieving the pressure on the main valve C. D is the cut-off valve, which is operated by any ordinary or suitable reversing valve-gear, as hereinbefore explained. The ports F F' in the fixed plate E coöperate between the steam-ports in the main valve C and the cut-off valve D.

In Fig. 3 the cut-off valve D is shown as one plate with a fixed lead, whereas in Fig. 2 the cut-off valve is shown in two pieces D and D', whereby they may act as starting-valves and their lead may be adjusted and the rate of expansion further varied by adjusting the valves D and D' to and from each other, which may be effected by any ordinary or suitable means; but it will be understood that the cut-off valve may be arranged as either one or two plates in either of these cases.

The reversing expansion valve-gear may be regulated by hand or by a governor, and also the adjustment of the two cut-off plates may be regulated by hand or by a governor by any of the ordinary or suitable attachments for effecting the analogous movements of the sliding parts in reversing-gears.

The cut-off valves shown in Figs. 2 and 3 may operate in either the same or the opposite direction to that of the main valves.

Figure 4:
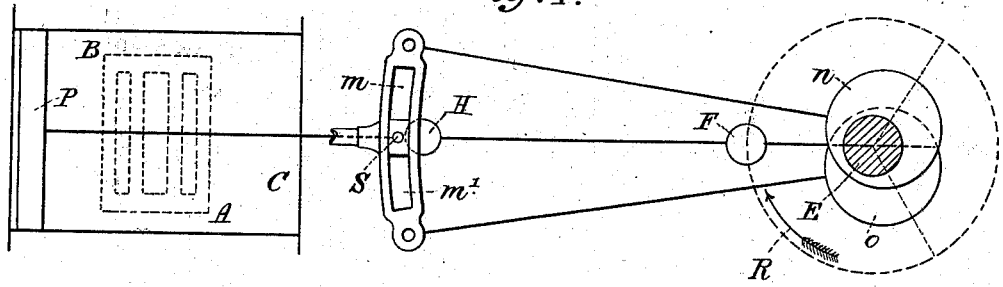
Figs. 4, 5, and 6 are diagrams illustrative of different forms of mechanism which may be employed to operate the cut-off valves.
Figure 5:
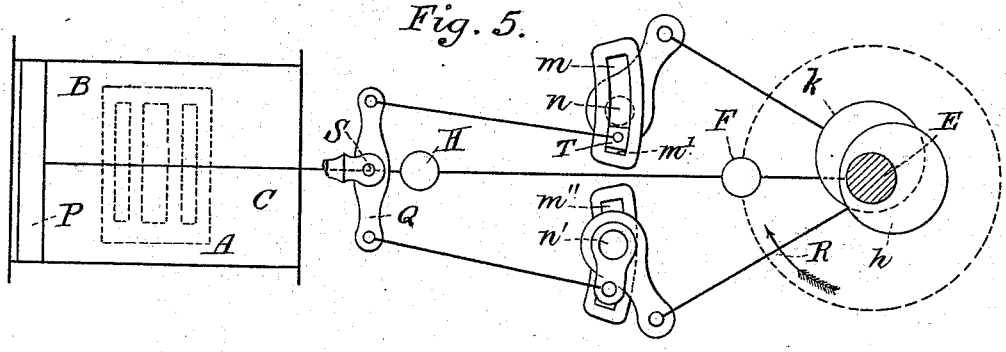
Figure 6:
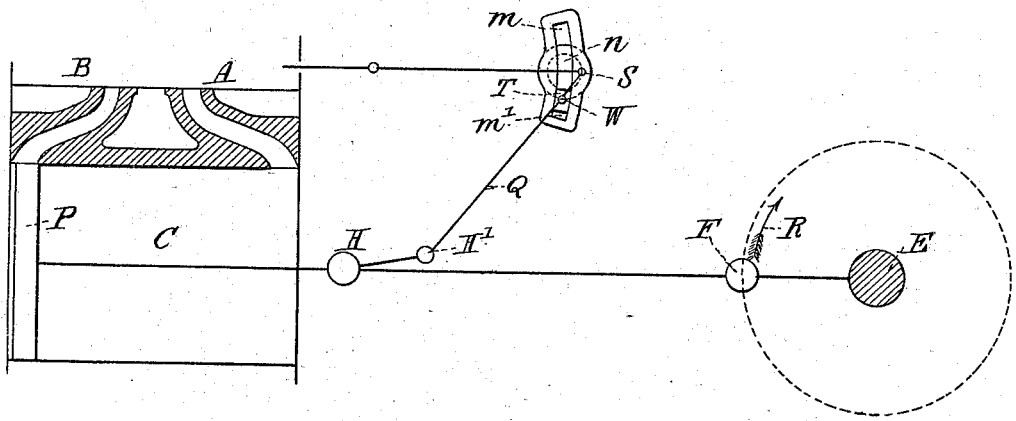

Figs. 4, 5, and 6 illustrate a few varieties of cut-off-valve mechanism suitable for combination with cut-off valves according to my invention. In all these figures C is the cylinder. P is the piston. A B is the face on which the main valve slides. H represents the cross-head. E is the crank-shaft. F is the crank-pin. M M' is the variable expansion-link. S is the attachment for the cut-off-valve rod. The arrow R shows the direction in which the crank-shaft is turning. In all these cases the expansion-link possesses the properties of movement of a reversing-link, but it is connected to the cut-off valve and therefore only regulates the rate of expansion.

The valve-slides are not shown in Figs. 4, 5, and 6; neither is the gear for operating the main valve shown; but the main valve may be operated in any convenient and ordinary manner.

Fig. 4 illustrates a mechanism (similar in its properties of movement to a double eccentric reversing-link) wherein $n$ is the late cut-off eccentric, and $o$ is the early cut-off eccentric. $m$ is the late cut-off position in the link, and $m'$ is the early cut-off position in the link, and such link $m\ m'$ may be raised or lowered by hand or by a governor.

Fig. 5 illustrates a mechanism suitable for the purpose of my invention, similar in its properties of movement to a reversing-gear combining two movements from which a resultant movement is obtained for the valve-rod, $k$ being the reversing or variable expansion eccentric and $h$ the constant lead and lap eccentric. The eccentric $k$ operates the rocking shaft $n$, and the eccentric $h$ operates the rocking shaft $n'$. The rocking shaft $n'$ transmits its movement to one end of the swinging lever Q by means of the constant travel-crank. The rocking shaft $n$ transmits its movement to the other end of the swinging lever Q by means of the variable expansion-link $m\ m'$. Here $m$ is the late cut-off position and $m'$ is the early cut-off position in the link $m\ m'$. The block T may be raised or lowered in the link $m\ m'$ by hand or by a governor. $m''$ is a link on the rocking shaft $n'$ for the operation of the valves of other cylinders operating at right angles to the cylinder shown.

Fig. 6 illustrates a mechanism also suitable for the purposes of my invention, similar in its properties of movement to a reversing-gear combining two movements from which a resultant movement is obtained for the valve-rod, in which $m\ m'$ correspond to the reversing-link. The rocking shaft $n$ rocks the variable expansion-link $m\ m'$, in which link $m$ is the late cut-off position and $m'$ is the early cut-off position. The rocking shaft $n$ is rocked by any convenient mechanism operating at right angles to the crank-pin F and the lever Q gives the constant lead movement. The lever Q receives its movement from the cross-head H by means of the rod H H' and is fulcrumed at $w$. The block T carrying the fulcrum $w$ may be raised or lowered in the variable expansion-link $m\ m'$ by hand or by a governor.

In Fig. 4 the two eccentrics $n$ and $o$ have equal and symmetrical angles of advance or lead, when the lead of the cut-off valve will always be the same; but the angles of lead of the two eccentrics may be varied relatively to each other, thereby varying the lead in the slides; but still the feature of my invention may be retained, and similarly the lead may be varied in other gears hereinbefore referred to.

What I claim is—

The combination with the main valve and cut-off valve of an engine, of a cut-off-valve gear consisting of a block connected to the cut-off valve and slidably mounted in a link, such as is hereinbefore defined, and operated independently of the main-valve block, the said cut-off-valve block being connected with a moving part of the engine so that the two motions thus secured effect different degrees of cut-off, substantially as described.

In testimony whereof I have signed my name to this specification in the presence of two subscribing witnesses.

C. W. THOMPSON.

Witnesses:
 JNO. LLOYD,
 HENRY R. JONES.